Dec. 22, 1931.  J. H. EDWARDSEN  1,837,766
MILLING MACHINE HEAD
Filed May 28, 1927
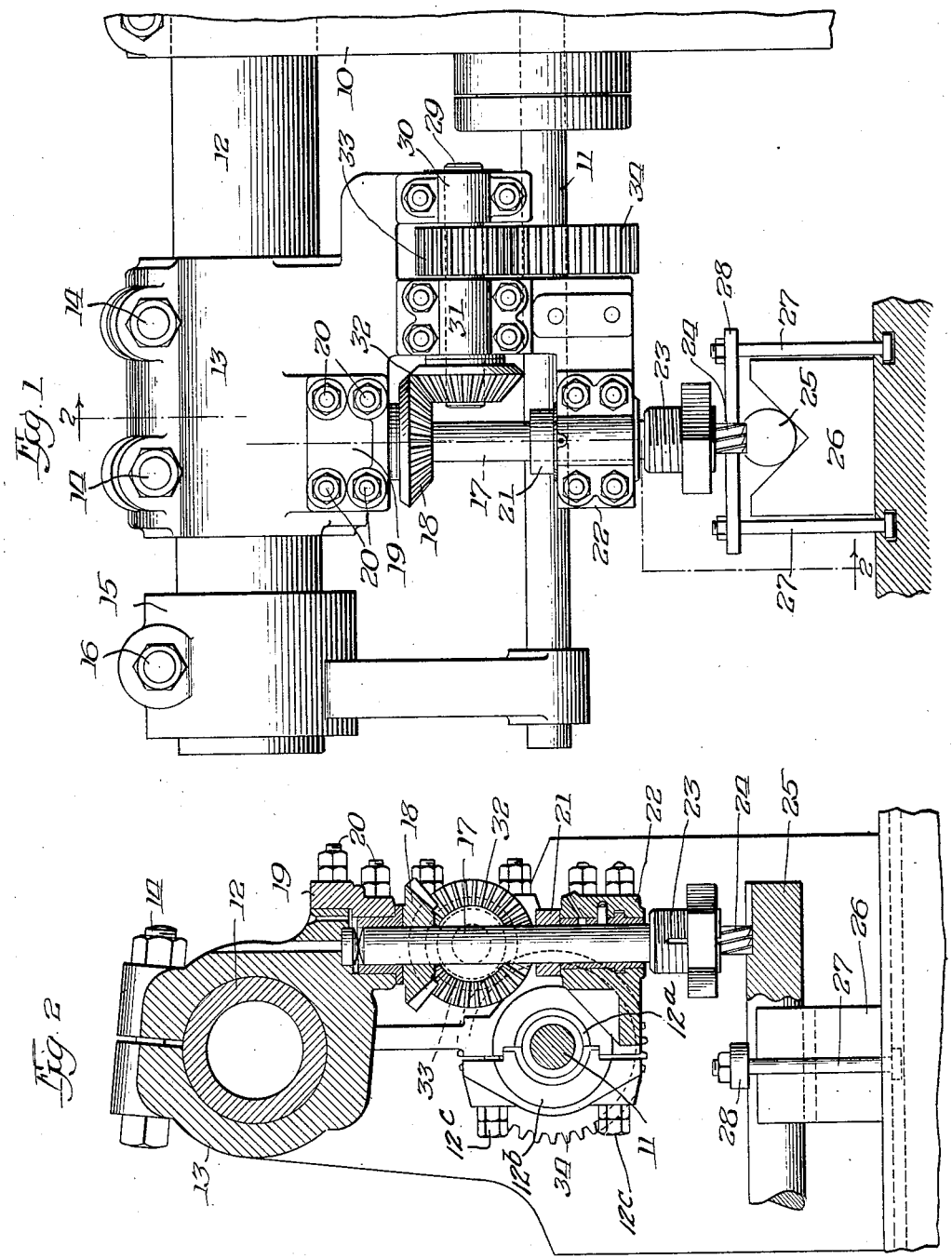
Witness:
Inventor
John H. Edwardsen
By R. Anthony Reina
Atty.

Patented Dec. 22, 1931

1,837,766

UNITED STATES PATENT OFFICE

JOHN H. EDWARDSEN, OF CHICAGO, ILLINOIS

MILLING MACHINE HEAD

Application filed May 28, 1927. Serial No. 194,893.

My invention relates to a milling attachment for horizontal milling machines, whereby a horizontal machine is converted into a machine capable of performing work in a vertical direction and has particular reference to a milling attachment which is adjustably secured to the milling machine and which can be easily turned out of its work position without resort to a crane or the like, when it is desired to use the milling machine for horizontal work.

Another and further objects of my invention is the provision of an attachment for milling machines by which the ordinary horizontal machine is capable of performing work of two classes, namely, horizontal work and also any work where the milling tool is positioned in a vertical direction, thereby doubling the use of the milling machine and also enabling it to do better and accurate work in a vertical direction than can ordinarily be accomplished in a machine of horizontal direction.

Another and further object of my invention is the provision of a milling attachment which is adjustable in a horizontal direction as well as adjustably secured to the milling machine so that the range of work performed by the milling machine is much greater than if it were held in fixed position with relation to said milling machine.

These and other objects of my invention will be more fully and better understood by reference to the accompanying sheet of drawings, in which—

Figure 1 is an elevational view of my improved invention in position on the milling machine; and Figure 2 is a sectional view on lines 2—2 of Figure 1.

Referring now specifically to the drawings, a milling machine 10 is shown having the usual horizontal milling shaft 11 extending therefrom and to which a milling head is secured in the usual manner. Attached to the milling machine 10 is an overhead arm 12, this arm being secured to the milling machine in any approved manner, and upon which a bracket 13 is secured by being clamped therearound by a pair of bolts 14, 14, the said bracket 13 being movable horizontally on the arm 12 and also rotatable upon the arm 12 as an axis, thus bringing the bracket 13 and attached mechanism up out of the way when it is desired to perform milling operations with the use of the horizontal milling shaft 11. A bearing 12a is provided which fits over the milling shaft 11 at the lower end of the bracket 13, and which has a bearing cap 12b fitted thereover and held in position by means of bolts 12c which extend through the lower end of the bracket 13.

A bracket 15 is provided which is secured to the outer end of the overhead arm 12 by being clamped thereto by a bolt 16, the said bracket 15 extending downward and adapted to receive the outer end of the shaft 11, forming a support for the outer end of the shaft 11 and holding it in proper alignment. A vertical milling shaft 17 is provided which is mounted in the bracket 13 and which has a beveled gear wheel 18 secured thereto, the said gear wheel being in fixed relation with the shaft 17 and free to rotate therewith. The upper end of the shaft 17 is mounted in a bearing block 19 held in position by a plurality of bolts 20, 20 to the bracket 13, the lower end of the said shaft also having a bearing 21 which is mounted in a bearing bracket 22 at the lower end of the bracket 13, with a milling attachment 23 being secured to the lower end of the said shaft within which a milling cutter 24 is mounted. A work piece 25 is mounted in a V-shaped opening of a work holder 26, the work piece 25 being clamped in position by a pair of vertical bolts 27, 27 having a clamping member 28 secured to the upper end thereof and which is adapted to hold the work piece 25 in proper position while the milling operation, such as cutting a keyway and the like, is being performed thereon.

Mounted in said bracket 13 is a short horizontal shaft 29, this shaft being secured to the bracket 13 by a pair of caps 30 and 31, the said shaft at one end thereof having a beveled gear 32 mounted thereon in toothed engagement with the bevel gear 18 heretofore described, the said shaft also having a gear wheel 33 mounted thereon intermediate its ends and in engagement with the second gear wheel 34 mounted upon the horizontal milling shaft 11 of the milling machine 10, so that the power is conveyed to the cutter 24 through the pair of gears 34 and 33 and the bevel gears 32 and 18 and the shaft 17. The gear wheel 34 is adjustably mounted upon the shaft 11 so that this wheel can be properly positioned to mesh with the gear wheel 33 in different horizontal positions of the bracket 13 upon the arm 12, so that the bracket 13 and milling tool 24 can be properly centered for different sized work pieces held upon the holding member 26.

When it is desired to use the horizontal bearing shaft 11, the bearing cap 12c is removed from the bearing thereby loosening the lower end of the bracket 13 from the milling shaft, the nuts on the bolts 14 are loosened and the bracket 13 is turned about the arm 12 as an axis, the nuts on the bolts 14 being tightened so that the whole device is held out of the way. When it is desired to operate the vertical attachment, the nuts on the bolts 14, 14 are loosened and the device turned downward into a vertical position as shown in Figure 1, and the bracket 13 adjusted to proper position longitudinally of the arm 12 so that the milling machine is properly centered with respect to the work piece and the lower end of the bracket 13 secured to the horizontal milling shaft 11 by means of the bearing 12a and bearing cap 12b. The gear wheel 34 is properly adjusted on the shaft 11 so as to engage the gear 33, whereupon the nuts on the bolts 14, 14 are tightened securely holding the bracket 13 in vertical position on the arm 12. The bracket 15 is thereupon located in position so that the free end of the shaft 11 is supported, without liability of bending or causing this shaft to break or allowing the gear wheel 34 to work out of mesh with the gear wheel 33. After the device has been used in the vertical position, the operation above described can be reversed, thus swinging the bracket entirely clear of the machine for horizontal work.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

A vertical attachment for milling machines comprising, in combination, a bracket constructed and arranged for attachment to the over head arm of the milling machine, an arm depending from the bracket, said arm providing a plurality of spaced bearings for a vertical tool shaft and being mounted for swinging movement about the over head arm of the milling machine, a plurality of gears mounted on a shaft carried by the arm, one of said gears being arranged to engage a cooperating gear carried by the tool shaft, and the other of said gears being located to engage a gear carried on the horizontal milling shaft, and a split bearing carried by the arm and arranged to encircle the horizontal milling shaft, said bearing being mounted remote from all of the aforementioned gears and being split in a direction extending substantially radially of the arc through which the bracket moves in swinging.

Signed at Chicago, Illinois, this 23rd day of May, 1927.

JOHN H. EDWARDSEN.